INVENTORS.
DONALD S. PECK
HENRY J. McGINTY
BY
Donald P. Smith
ATTORNEY

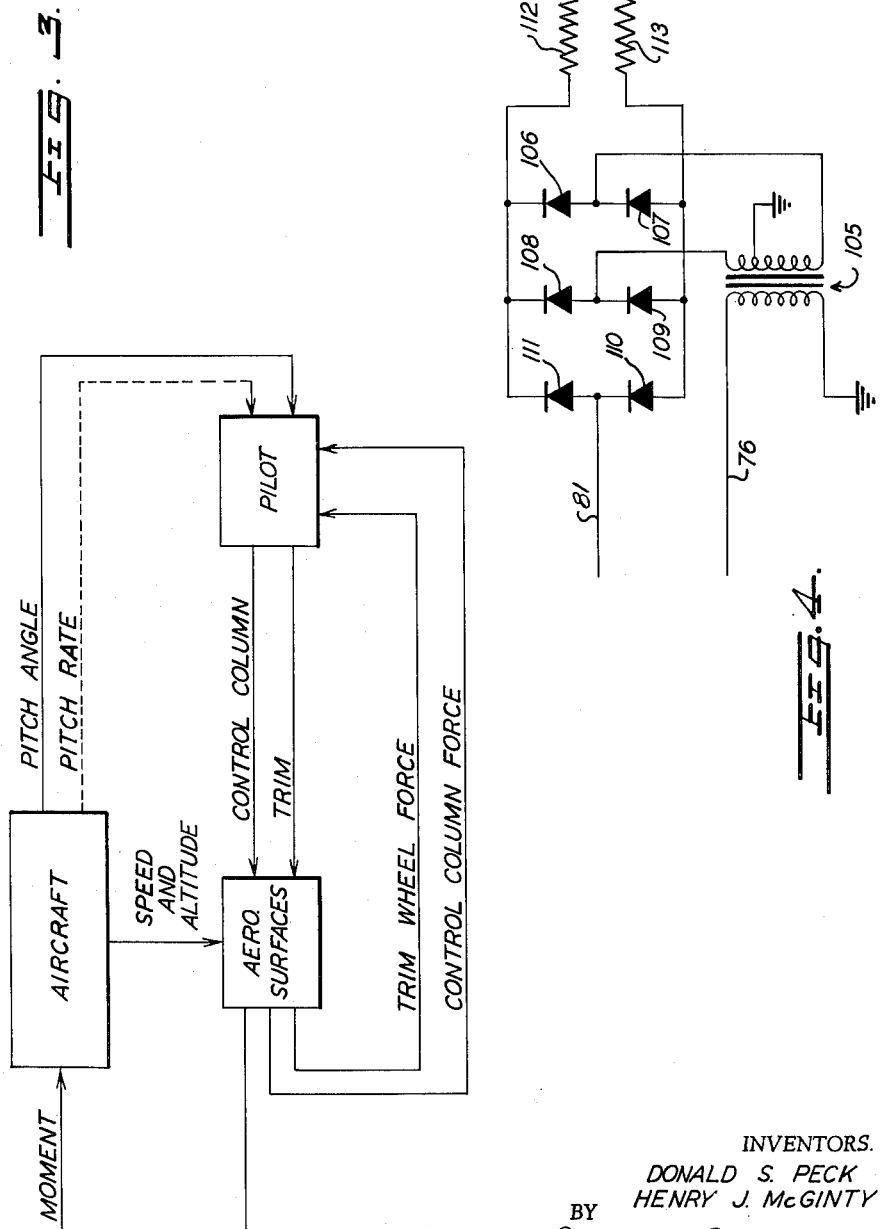

United States Patent Office 3,026,629
Patented Mar. 27, 1962

3,026,629
STABILIZER TRIM FORCE SIMULATION
Donald S. Peck, Washington, D.C., and Henry J. McGinty, West Hyattsville, Md., assignors to ACF Industries, Incorporated, New York, N.Y., a corporation of New Jersey
Filed Apr. 15, 1958, Ser. No. 728,596
9 Claims. (Cl. 35—12)

This invention relates to the loading of a control element which may be manipulated by a student during simulated flight in a grounded aircraft trainer or similar apparatus, and relates more particularly to a system for simulating the variations in forces on the stabilizer trim wheel resulting from simulated aerodynamic loading and from simulated connecting cable stretching.

In an aircraft, the trim system consists of a stabilizer trim hand wheel manually rotatable by the pilot and connected by control cables to a rotating drum on the stabilizer trim actuator which is located near the aircraft's horizontal stabilizer. This drum is connected to a jack screw which turns to position the stabilizer in accordance with the direction and degree of rotation of the hand wheel. There is also a power driven trim unit; and the autopilot trim power unit turns the same drum through an automatically disconnectable clutch which is arranged to disconnect when a predetermined magnitude of opposing torques are impressed by the power trim and the manual trim by way of the cable drum. Thus the pilot can overcome the operation of the electrical trim switches and the operation of the autopilot.

Aerodynamic loading forces on the trim surfaces are reflected at the pilot's hand wheel. However, a friction brake prevents this force from ever aiding the pilot, but actually increases the force required by the pilot in proportion to aerodynamic load even when the loading is in the same direction that the pilot wants to trim.

This invention provides a circuit which realistically simulates the stabilizer trim system described above.

It is, accordingly, a broad object of this invention to provide a circuit for simulating to a student pilot the forces on the stabilizer trim hand wheel caused by aerodynamic loading of the simulated stabilizer surfaces during a training flight.

It is a more distinct object of this invention to provide a grounded aircraft trainer having a simulated stabilizer trim hand-wheel movable in accordance with the forces of simulated aerodynamic loading and having a reaction system analogous to the stretching of the power transmitting cable.

It is a more distinct object of this invention to provide a system, in a grounded flight simulator, to reproduce to the student, the mechanical feel of the loads on the stabilizer trim hand wheel and to derive a voltage usable in an analog computer which is representative of the position of the simulated stabilizer control surface.

The novel features of the invention are set forth with particularity in the appended claims and specification and the invention will be best understood from a consideration of the following description when read in connection with the accompanying drawings, in which:

FIG. 3 is a schematic representation of some of the forces and indications encountered by a pilot when flying an actual aircraft.

FIG. 4 is a schematic wiring diagram of a selector circuit utilized in the invention.

In summary, the invention consists of a system in an aircraft trainer of the type having aerodynamic computers to derive voltages proportional to flight functions of Mach number, altitude, and elevator position comprising a mechanical differential system having two input shafts and an output shaft turnable in accordance with the differential in forces applied to the two input shafts. A stabilizer trim hand wheel, for manipulation by the student, is connected to one input shaft and a brake and a driving clutch are connected to the other input shaft. A spring biases the output shaft to a neutral position to realistically simulate the force required to stretch a connecting cable and to limit the motion of the shaft; and a potentiometer fixed to the output shaft derives a voltage proportional to the displacement thereof from its neutral position. A selector circuit connected to the aerodynamic computers and the output shaft potentiometer supplies the computer voltages to the brake fixed to the input shaft only when it is larger than the output shaft voltage, and another circuit connected to an electrical trim force computer, to the output shaft potentiometer and to the driving clutch connects the trim force voltages to the clutch to simulate aircraft power trim functions only when it is larger than the output shaft voltage. A potentiometer connected to the input shaft having the brake and clutch fixed thereto derives a voltage proportional to the position of the simulated trim surfaces; such voltage being usable in the aerodynamic computer of the training device.

In FIG. 3 there is disclosed a simplified diagrammatic representation of several controls and forces which are encountered in an aircraft as referred to the pilot. The pilot has available for manipulation two controls, the control column and the trim wheel which operate under this urging to vary the positions of the aerodynamic surfaces provided on the aircraft itself. The slip stream, as determined by the speed and altitude of the aircraft, reacts with the aerodynamic surfaces to produce a moment which tends to rotate the aircraft about its transverse axis thereby producing a pitch rate. The pilot has available in the cockpit an instrument to reveal to him the value of the pitch angle, as developed from pitch rate, and the motion of the aircraft imparts accelerations to his body whereby he can sense changes in pitch rates. The aerodynamic forces also return forces to the pilot so that he can feel the control column force reacting upon his arms, and the trim wheel force reacting against his hand when he attempts to change the trim. The above explanation is given as an aid to the understanding of the conditions which are simulated in the instant invention.

Figure 1:
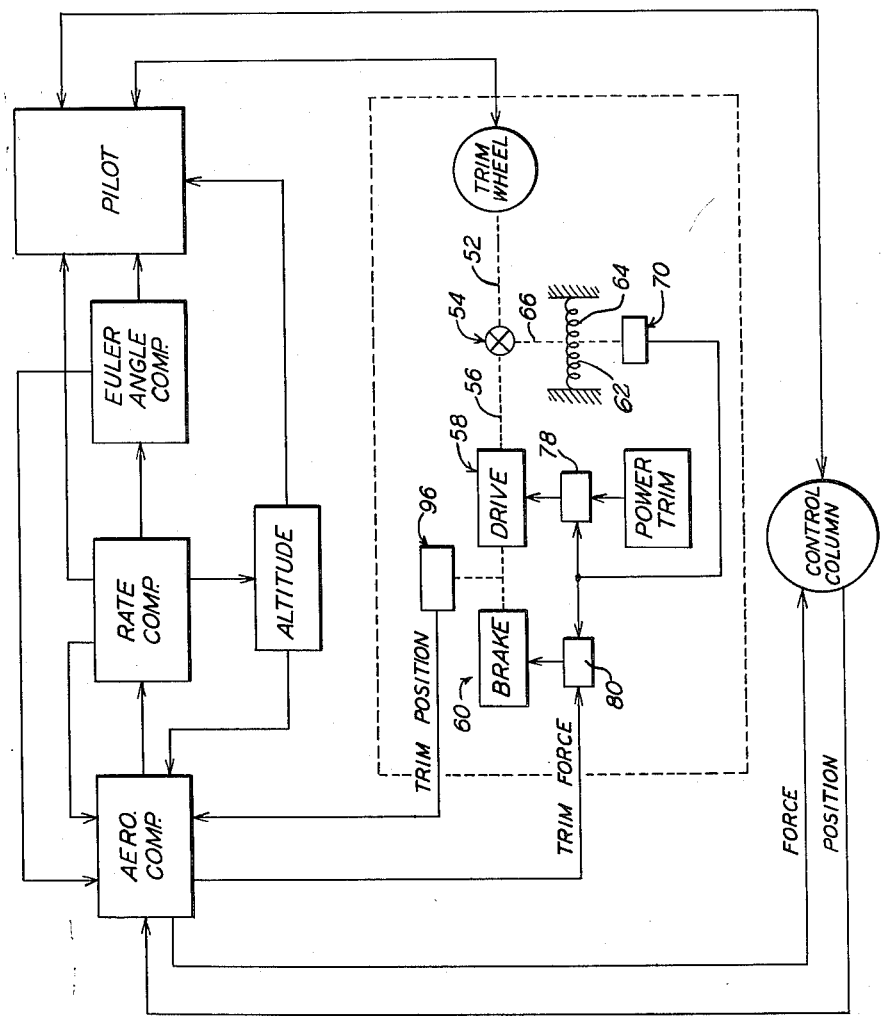
FIG. 1 is a schematic diagram of a flight simulator showing the preferred setting of applicants' invention.

Referring now to FIG. 1, wherein a complete trainer is shown in greatly simplified schematic form, the contribution made herein is shown within the broken lines. In general, three major computer units are provided, the aerodynamic computer, which in well known ways, derives voltages representing air speed, forces, moments, and accelerations in accordance with inputs received from inter alia, the altitude computer, the position of the control column and the position of the stabilizer trim. The rate computer integrates the voltages received from the aerodynamic computer. An example of the function of this computer would be to receive the air speed from the aerodynamic computer and calculate the instantaneous altitude by separating out the vertical component. This altitude voltage appears in the pilot's compartment on an instrument provided for that purpose and is also fed back to the aerodynamic computer for calculating the forces on the aerodynamic surfaces. The Euler angle computer integrates the several rates fed thereto and determines the attitude or flight path of the aircraft. This characteristic is fed back to the aerodynamic computer and is also revealed to the pilot in a series of instruments. The pilot following the FIG. 3 explanation, has available to him two controls; the control column and the trim wheel. His moving of the control column derives a voltage input to the aerodynamic computer to change the instantaneous condition and a force is derived which tends to resist control column deflection and represents the force exerted by the motion of the aircraft through the air and the reaction of the slipstream against the control surfaces. His moving of the trim wheel derives, in the final analysis, a voltage which represents the trim position and is fed to the aerodynamic computer. Trim forces in the form of derived voltages are fed from the aerodynamic computer indirectly into a brake provided on the trim wheel assembly. The detailed explanation of the structure disclosed within the broken line will be made with reference to FIG. 2. It is sufficient for the present purposes to state that a potentiometer 96 derives the voltage representing trim position, a driving clutch 58 operates in accordance with power trim as selected by the pilot, a brake 60 simulates friction force and aerodynamic forces, the forces passing through a differential 54 having two input shafts 56 and 52 and an output shaft 66. A pair of springs 62 and 64 tends to keep the output shaft in a neutral position and a potentiometer 70 derives a voltage representing the force exerted by the pilot on the trim wheel which voltage is compared with trim force voltage from the aerodynamic computer in circuit 80 and power trim forces in a circuit 78, for selective transmission to the clutch and brake.

Figure 2:
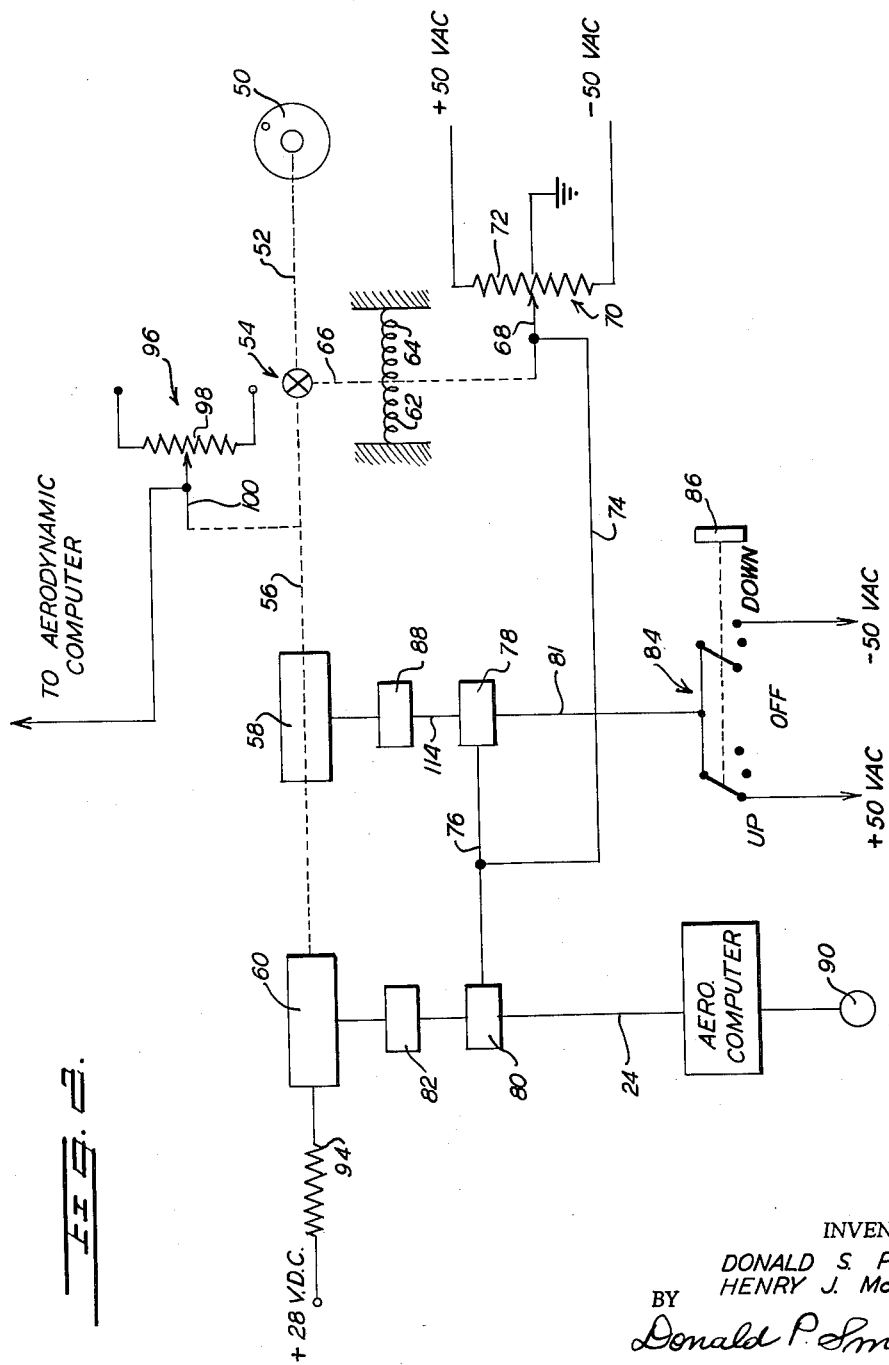
FIG. 2 is a schematic diagram showing the details of the circuit embodying the invention.

Referring now to FIG. 2 where the details of the stabilizer trim circuit are shown, reference character 50 indicates the stabilizer trim hand wheel which is fixed for rotation in the cockpit within reach of the student, and is connected to an input shaft 52 of differential 54. A second input shaft 56 has connected thereto a driving clutch 58 and a brake 60. It will be understood that shaft 56 is continuous from the output shaft of brake 60 into the differential 54. Brake 60 may be any electromagnetically actuated type such as the eddy current brake or the fluid particle type, both of which are well known in the art. The driving clutch 58 may be a motor or a motor and clutch combination such that the motor runs continuously and an input to the clutch serves to connect the motor to the shaft 56.

A pair of torsion springs 62 and 64 are secured at one end to output shaft 66 and at the other end to a fixed member to urge the shaft into a neutral position. Also fastened to output shaft 66 is wiper arm 68 of potentiometer 70 having a resistance winding 72 grounded at the mid-point and having oppositely phased A.C. voltage applied to the extremities thereof. As will be apparent from the diagram, rotation of shaft 66 from a neutral position moves wiper arm 68 along resistance winding 72 thereby deriving a voltage proportional to the degree of motion away from the neutral position and having a sign depending on the direction of rotation. Rotation of shaft 66 also winds one or the other spring to thereby obtain a resisting force proportional to the shaft rotation. The springs also act as a brake to terminate shaft rotation, after a predetermined number of turns.

Differential 54 is the conventional mechanical type wherein a difference in the forces applied to input shafts 52 and 56 results in rotation of output shaft 66.

Wiper arm 68 is electrically connected by conductor 74 and conductor 76 to selector circuits 78 and 80, which circuits are identical and will be more fully explained in connection with the description of the operation of this system and with the description of FIG. 4. Circuit 78 has an input from conductor 81 leading from a switch 84 having a control 86 disposed in the vicinity of the student pilot so that he may elect from a plurality of possible positions. The voltages transmitted through the switch represent the conventional power trimming function as performed in the actual aircraft.

A demodulator 88, of conventional design, converts 60 cycle alternating current to direct current and connects the output of selector circuit 78 to the clutch 58.

The control column 90 which is available for manipulation by the student, operates to derive voltages in the aerodynamic computer proportional to functions of Mach number, altitude, and elevator control position which as explained above represent the forces on the control surfaces. This voltage is applied to selector circuit 80 through conductor 24 which is connected through conductors 76 and 74 to the output of potentiometer 70. Selector circuit 80 operates to compare the voltage inputs thereto and to pass the aerodynamic computer voltage to the demodulator 82 only when it is larger than the voltage input from potentiometer 70. Demodulator 82 is identical with demodulator 88, and the output thereof energizes brake 60 to retard motion of shaft 56.

A separate source of direct current voltage is applied to resistor 94 as one input to brake 60. This voltage acts to reproduce the constant system friction which exists in the actual aircraft.

A potentiometer 96 having a resistance winding 98 has wiper arm 100 mechanically coupled to shaft 56 and electrically connected to the aerodynamic computer as shown in FIG. 1. The potentiometer derives a voltage proportional to the position of the stabilizer trim surfaces.

The operation of this system is as follows:

Let us assume that the electrical trim switches 84 are in the Off position and the aerodynamic computer has a zero output, then the only voltage fed to the devices on shaft 56 is the friction voltage into brake 60. If the pilot now turns wheel 50, shaft 56 will be held by brake 60 until he exerts enough force to wind up one of the springs which then acts as an output shaft brake to overcome the simulated friction force. The winding of the spring will give the pilot the impression of the stretching of the connecting cable and will move wiper arm 68 across resistor winding 72. This motion will derive a voltage, small at first but increasing in magnitude as the wiper moves away from the grounded midpoint. This voltage is applied into the two selector circuits 80 and 78. Since we have assumed no other inputs to these circuits, the voltage will not be passed into brake 60 and motor 58, as will be clear from the explanation of the circuit of FIG. 4. When the force of the spring attached to shaft 66 balances the simulated friction force from brake 60, then shaft 56 starts to rotate, deriving a voltage on potentiometer 96 to represent the new trim position corresponding to the turning of the hand wheel. If the pilot then rotates the shaft in the other direction, twice the hand wheel rotation is required before any simulated trim is obtained from potentiometer 96 since rotation of the hand wheel will first relax one spring and then compress the other before the force has built up in the opposite direction which is equivalent to the constant friction output of the brake.

If a voltage simulating an aerodynamic load from the aerodynamic computer is impressed on circuit 80, it will be there compared to the voltage derived at potentiometer 70. If it is the larger of the two, it will be impressed on brake 60 thereby reinforcing the existing simulated friction load and acting as an aerodynamic load on the control force. If the pilot rotates the hand wheel 50 and derives a voltage at potentiometer 70 of equal magnitude, then the input from the aerodynamic computer will no longer be transmitted to the brake and shaft 56 will turn.

If the pilot elects to apply power trim in either up or down condition through control 86, then the voltage is directly applied through selector circuit 78 demodulator 88 to clutch 58 and shaft 56 will rotate and derive the voltage from potentiometer 96. However, the pilot can if he wishes overcome this trim by rotating his trim wheel 50 in the proper direction until potentiometer 70 derives a voltage to equal the voltage from switch 84 as compared in selector circuit 78 which will thereafter de-energize the drive 58 and shaft 56 will stand still.

Reference is now made to FIG. 4 which reveals the details of the comparison and selector circuits generally designated in FIG. 2 as reference characters 78 and 80. For the purpose of this explanation, circuit 78 is here shown wherein the voltage input from potentiometer 70 is designated as the reference voltage and is applied through conductor 76, and the voltage from the switches 84 used to simulate power trim positioning is applied through conductor 81. A transformer 105 having its secondary grounded at the midpoint to provide two A.C. voltages of equal magnitude and opposite phase, receives the output from potentiometer 70. The secondary of the transformer is connected to the junctions of two pairs of diodes 106, 107, 108 and 109. Conductor 81 is connected to the junction of another pair of diodes 110 and 111 and to the aerodynamic computer. All three of the diode pairs are connected in parallel to a pair of equal valued resistors 112 and 113, which are joined to conductor 114 for connection to demodulator 88. The grounding of the secondary of transformer 105 makes the phase derived by wiper arm 68 immaterial since both polarities are impressed on the junction of the diode pairs there shown. In accordance with the principles of diode operation, a voltage will be transmitted only if there is no opposing voltage of greater magnitude to bias it. For example, if wiper arm 68 is at the neutral or ground position of potentiometer 70 and no voltage is impressed on the primary of transformer 105, then diode pairs 106, 107, 108 and 109 have no voltages impressed thereon and any voltage appearing from conductor 81 will be passed by the diode pair 110 and 111 to resistors 112 and 113, each carrying its respective phase in the cycle, to the demodulator. As wiper arm 68 develops a larger and larger voltage, immaterial of phase, diodes 106, 107, 108 and 109 respectively bias against diodes 110 and 111 so that the voltages appearing at resistor 112 and 113 will be the difference between the magnitude of the voltages impressed on conductors 81 and 76. It follows then that with wiper arm 68 in its extreme positions wherein a full fifty volts is developed, then the fifty volt input from conductor 81 will be completely balanced and the demodulator receives zero input. Thus the potentiometer 70 when used in connection with the selector circuits 78 and 80 act as a subtracting circuit to remove from the voltages impressed on the circuit that portion which is derived by wiper arm 68. If no voltage appears at conductor 81 and the potentiometer 70 derives a voltage, then the split phases are passed through the respective diode pairs but, being equal in magnitude and opposite in sign, no voltage appears at the output. Thus the output of the potentiometer can never drive or brake shaft 56 through clutch 58 and brake 60. Driving of the shaft is done mechanically through the differential when the hand wheel is turned.

Since the motion of wiper arm 68 along resistance winding 72 is comparatively slow, the voltage decrease is gradual and the driving force is removed slowly from driving means 58 thereby realistically simulating the effects of pilot manual opposition to the electric trim cycle and the final stoppage thereof.

Having described a preferred embodiment of the present invention, it is to be understood that although specific terms and examples are employed, they are used in a generic and descriptive sense and not for purposes of limitation; the scope of the invention being set forth in the following claims.

What is claimed is:

1. In a grounded aircraft trainer of the type having aerodynamic computers to derive voltages proportional to functions of Mach number, altitude, and elevator position, a system for simulating to a trainee the variations in forces on the stabilizer trim wheel resulting from simulated aerodynamic loading and simulated connecting cable stretching comprising in combination a mechanical differential having two input shafts and an output shaft turnable in accordance with the difference in forces applied to the input shafts, a stabilizer trim hand wheel connected to one input shaft for manipulation by a student, a braking means and a driving means connected to the other input shaft, yielding means biasing the output shaft to a neutral position to simulate the force required to stretch a connecting cable, means on the output shaft to derive a voltage proportional to the displacement thereof from neutral position, an electrical circuit connected to the aerodynamic computers, to the said voltage deriving means and to the said braking means and operative to connect the computer voltage to the braking means to simulate aerodynamic loading only when it is greater in magnitude than the derived voltage proportional to the output shaft displacement, an electrical circuit including a source of voltage representing electrical trim force connected to the said voltage deriving means and to the said driving means and operative to connect the said source of voltage to the driving means to simulate aircraft power trim functions only when it is greater in magnitude than the derived voltage proportional to the output shaft displacement.

2. In a grounded aircraft trainer of the type having aerodynamic computers to derive voltages proportional to functions of Mach number, altitude, and elevator position, a system for simulating to a trainee the variations in forces on the stabilizer trim wheel resulting from simulated aerodynamic loading and simulated connecting cable stretching comprising in combination a mechanical differential having two input shafts and an output shaft turnable in accordance with difference in the forces applied to the two input shafts, a trim hand wheel connected to one input shaft for manipulation by a student, a braking means and a driving means connected to the other input shaft, yielding means biasing the output shaft to a neutral position to simulate the force required to stretch a connecting cable, means on the output shaft to derive a voltage proportional to the displacement thereof from neutral position, an electrical circuit connected to the aerodynamic computers, to the said voltage deriving means and to the said braking means and operative to connect the computer voltage to the braking means to simulate aerodynamic loading only when it is greater in magnitude than the derived voltage proportional to the output shaft displacement, an electrical circuit including a source of voltage under the control of the student and representing electrical trim forces connected to the said voltage deriving means and to the said driving means and operative to connect the said source of voltage to the driving means to simulate power trim functions only when it is greater than the derived voltage proportional to the output shaft displacement.

3. In a grounded aircraft trainer of the type having aerodynamic computers to derive voltages proportional to functions of Mach number, altitude, and elevator position, a system for simulating to a trainee the variations in forces on the stabilizer trim wheel resulting from simulated aerodynamic loading and simulated connecting cable stretching comprising in combination a mechanical differential having two input shafts and an output shaft turnable in accordance with a difference in the forces applied to the two input shafts, a stabilizer trim hand wheel connected to one input shaft for manipulation by a student, braking means and driving means respectively connected to the other input shaft, a spring biasing the output shaft to neutral whereby displacement thereof is resisted by the spring to simulate cable stretching, a voltage deriving circuit connected to the output shaft to produce a voltage proportional to displacement, a selector circuit connected to the aerodynamic computers, to the voltage deriving circuit and to the braking means to connect the computer voltage to the braking means only when it is greater than the derived voltage proportional to output shaft displacement, a circuit having switching means under the control of the student and including a source of voltage representing electrical trim forces, and a second selector circuit to connect the output of the voltage deriving circuit to the driving means only when the source of voltage is greater in magnitude than the derived voltage proportional to the output shaft displacement.

4. In a training device of the type having aerodynamic computers a system for simulating to a trainee the variations in force on a stabilizer trim wheel resulting from aerodynamic loading and cable stretching comprising in combination a differential having an output shaft and two input shafts, a stabilizer trim hand wheel connected to a first input shaft, a braking means and a driving means connected to a second input shaft, a spring biasing the output shaft to neutral position, voltage deriving means connected to the output shaft to produce a voltage proportional to the displacement thereof from neutral, a selector circuit connected to the aerodynamic computers, to the voltage deriving means and to the braking means to connect the computer output to the braking means only when it is larger than the output of the voltage deriving means, a circuit under the control of the student and including a source of voltage representing electrical trim forces, and a second selector circuit to connect the output of the voltage deriving means to the driving means only when the source of voltage is larger in magnitude than the derived voltage proportional to the output shaft displacement.

5. In a training device of the type having aerodynamic computers a system for simulating to a trainee the variations in force on a stabilizer trim wheel resulting from aerodynamic loading and cable stretching comprising in combination a differential having an output shaft and two input shafts, a stabilizer trim hand wheel connected to a first input shaft, a braking means and a driving means connected to a second differential input shaft, a spring biasing the output shaft to neutral position, voltage deriving means connected to the output shaft to produce a voltage proportional to the displacement thereof from neutral, a selector circuit connected to the aerodynamic computers, to the voltage deriving means and to the braking means to connect the computer output to the braking means only when it is larger than the output of the voltage deriving means, a circuit under the control of the student and including a source of voltage representing electrical trim forces, a second selector circuit to connect the output of the voltage deriving means to the driving means only when the source of voltage is larger in magnitude than the derived voltage proportional to the output shaft displacement, and a circuit connected to the braking means and including a source of voltage to represent substantially constant stabilizer system friction forces to retard rotation of the said second input shaft.

6. In a grounded aircraft trainer of the type having an aerodynamic computer to derive voltages proportional to functions of Mach number, altitude, and elevator position, a system for simulating to a trainee the variations in forces on the stabilizer trim wheel resulting from simulated aerodynamic loading, for simulating connecting cable stretching and for deriving a voltage usable in the aerodynamic computer representing the position of the simulated trim stabilizer, comprising in combination a mechanical differential having two input shafts and an output shaft, one input shaft turnable by the trainee in simulation of aircraft trim hand wheel rotation and the other input shaft turnable to represent the position of the simulated stabilizers and having a braking means and a driving means, means to bias the output shaft to a neutral position, a circuit having a member responsive to motion of the output shaft to derive a voltage proportional to the force exerted by the trainee, a first selector circuit connected to the first recited circuit and to the aerodynamic computer to connect the computer voltage to the braking means only when it is larger than the trainee force voltage, a second selector circuit connected to the first recited circuit and including a voltage source representing electrical trim forces to connect the same to the driving means only when it is larger than the trainee force voltage, and a voltage deriving circuit having a member connected to the said other input shaft to derive a voltage representing the position of the simulated trim stabilizer.

7. In a grounded aircraft trainer of the type having an aerodynamic computer to derive voltages proportional to functions of Mach number, altitude, and elevator position, a system for simulating to a trainee the variations in forces on the stabilizer trim wheel resulting from simulated aerodynamic loading, for simulating connecting cable stretching and for deriving a voltage usable in the aerodynamic computer representing the position of the simulated trim stabilizer, comprising in combination a mechanical differential having two input shafts and an output shaft, one input shaft turnable by the trainee in simulation of aircraft trim hand wheel rotation and the other input shaft turnable to represent the position of the simulated stabilizers and having a braking means and a driving means, means to bias the output shaft to a neutral position, a circuit having a member responsive to motion of the output shaft to derive a voltage proportional to the force exerted by the trainee, a first selector circuit connected to the first recited circuit and to the aerodynamic computer to connect the computer voltage to the braking means only when it is larger than the trainee force voltage, a second selector circuit connected to the first recited circuit and including a voltage source representing electrical trim forces to connect the same to the driving means only when it is larger than the trainee force voltage, a voltage deriving circuit having a member connected to the said other input shaft to derive a voltage representing the position of the simulated trim stabilizer, and a circuit including a constant source of voltage connected to the braking means to represent friction forces.

8. In a training device for simulating the behaviour in a vehicle of a manually actuated element used to control a movable surface exposed to loading forces produced by fluid flow relative thereto, the device having computers to derive voltages proportional to the forces, comprising in combination a mechanical differential having two input shafts and an output shaft turnable in accordance with difference in forces applied to the input shafts, one said input shaft connected to the element for manipulation by a trainee, a braking means and a driving means connected to the other input shaft, means responsive to the position of the output shaft to derive a voltage proportional to the displacement thereof from a neutral position, a circuit connected to the computers to the said voltage deriving means and to the braking means to connect the computer voltage to the braking means to simulate movable surface loading only when it is greater in magnitude than the derived voltage proportional to output shaft displacement, an electrical circuit including a source of voltage connected to the said voltage deriving means and to the said driving means and operative to connect the source of voltage to the driving means to simulated powered movement of the surface only when it is greater in magnitude than the derived voltage proportional to the output shaft displacement.

9. In a training device for simulating to a trainee the variations in forces on a stabilizer trim wheel resulting from simulated aerodynamic loading, an aerodynamic computer to derive a voltage representative of trim force as a function of Mach number, altitude, trim tab position and elevator position, differential means including input members, and an output member movable from a neutral position in accordance with a differential in forces applied to said input members, means to derive a voltage proportional to displacement of the output member from its neutral position, a stabilizer trim wheel connected to one of said input members, a braking means and a driving means engageable with the other of said input members, a circuit connecting a source of fixed voltage to said driving means when said fixed voltage is greater than a voltage derived by displacement of said output member, and means to actuate said braking means to brake its respective input member when the voltage from the computer is greater than a voltage derived by displacement of said output member.

References Cited in the file of this patent

UNITED STATES PATENTS

| | | |
|---|---|---|
| 2,350,351 | Grunberg | June 6, 1944 |
| 2,397,477 | Kellogg | Apr. 2, 1946 |
| 2,428,767 | Albert et al. | Oct. 14, 1947 |
| 2,475,355 | Kail | July 5, 1949 |
| 2,636,285 | Fogarty et al. | Apr. 28, 1953 |
| 2,695,145 | Lear et al. | Nov. 23, 1954 |
| 2,741,036 | Amico | Apr. 10, 1956 |
| 2,804,698 | Grandmont | Sept. 3, 1957 |